Jan. 11, 1927.

G. WEISS

1,613,631

ACTUATING MECHANISM FOR MOLDING MACHINERY

Filed May 14, 1926      6 Sheets-Sheet 1

Fig.1

Inventor
George Weiss
By [signature] Atty.

Jan. 11, 1927.

G. WEISS 1,613,631

ACTUATING MECHANISM FOR MOLDING MACHINERY

Filed May 14, 1926    6 Sheets-Sheet 4

Inventor
George Weiss
By

Patented Jan. 11, 1927.

1,613,631

UNITED STATES PATENT OFFICE.

GEORGE WEISS, OF CHICAGO, ILLINOIS, ASSIGNOR TO INTERNATIONAL CONCRETE INDUSTRIES CORPORATION, OF CHICAGO, ILLINOIS, A CORPORATION OF DELAWARE.

ACTUATING MECHANISM FOR MOLDING MACHINERY.

Application filed May 14, 1926. Serial No. 108,995.

The invention relates in general to molding machinery but more specifically to the actuating mechanism therefor, and one of the objects of the invention is to provide improved means whereby the movements of the various parts of the machine will be effected, and such movement positively timed, by means of a plurality of master gears secured to the same shaft, whereby the master gears will be simultaneously driven from the same source of power and at the same rate of speed.

Each of the master gears is designed to provide a predetermined number of teeth so located as to cause a gear pinion to rotate through a predetermined number of degrees and then effect a locking thereof, thereby providing a direct gear connection with, and a master gear control of separate and independent movements, and also a positive locking of such movements, all in a complete cycle of operation of the shaft to which the master gears are connected.

The invention is particularly adapted, though not necessarily limited in its use in machines for forming blocks, bricks, tiles and the like, from plastic materials such as concrete, lime, gypsum, clays or other suitable material and for controlling the incremental feeding of the material to the mold in predetermined quantities, the withdrawing of the feeding mechanism, the tamping of the material, the withdrawing of a core or of the article from the mold box, the placing of the finished product in a position to be removed from the machine, and for performing any and all other machine functions in carrying out operations upon the material or article which it is desired, at predetermined times in any order of sequence in one cycle of movement or rotation of the shaft to which the master gears are connected.

Each of the master gears also controls and operates a crank mechanism which in turn operates the individual mechanism to be actuated, and such crank movements are particularly advantageous in machines of this character for actuating the mechanisms that are subjected to considerable resistance, in that the cranks will impart gradual or slow starting movements to the respective said mechanisms.

To the attainment of these ends and the accomplishment of other new and useful objects as will appear, the invention consists in the features of novelty in substantially the construction, combination and arrangement of the several parts, hereinafter more fully described and claimed and shown in the accompanying drawings illustrating this invention, and in which

Figure 1:
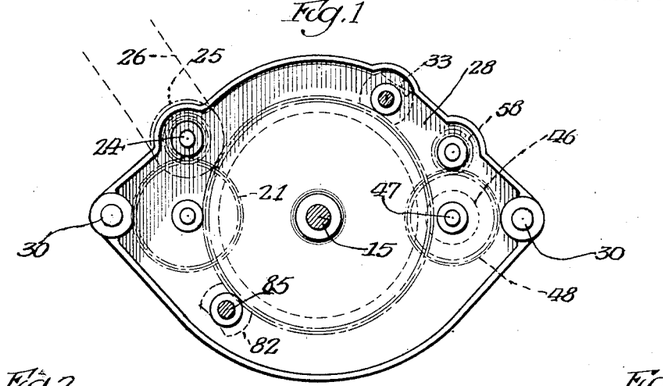
Figure 1 is a side elevation, partly in diagram, of an actuating unit constructed in accordance with the principles of this invention.
Figure 2:
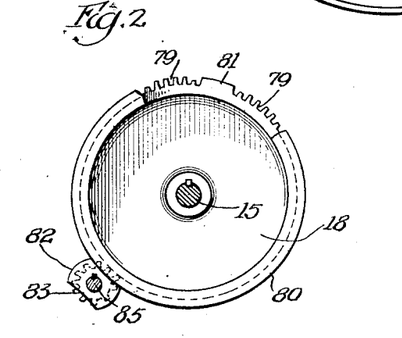
Figure 2 is a detail sectional view taken on line 2—2, Figure 8.
Figure 3:
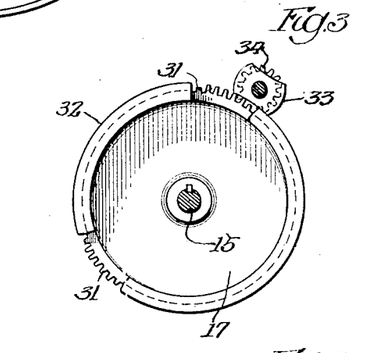
Figure 3 is a detail sectional view taken on line 3—3, Figure 8.
Figure 4:
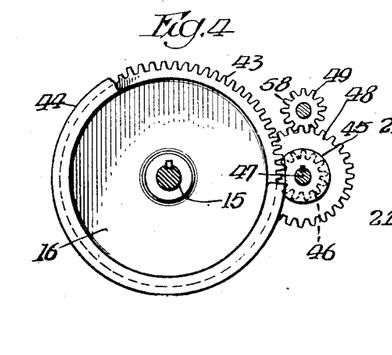
Figure 4 is a detail sectional view taken on line 4—4, Figure 8.
Figure 5:
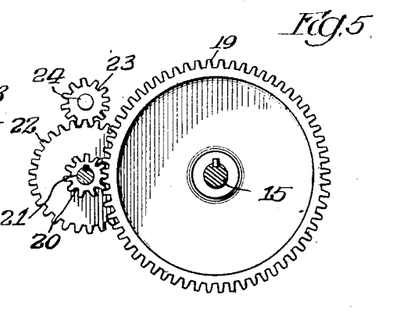
Figure 5 is a detail sectional view taken on line 5—5, Figure 8.
Figure 6:
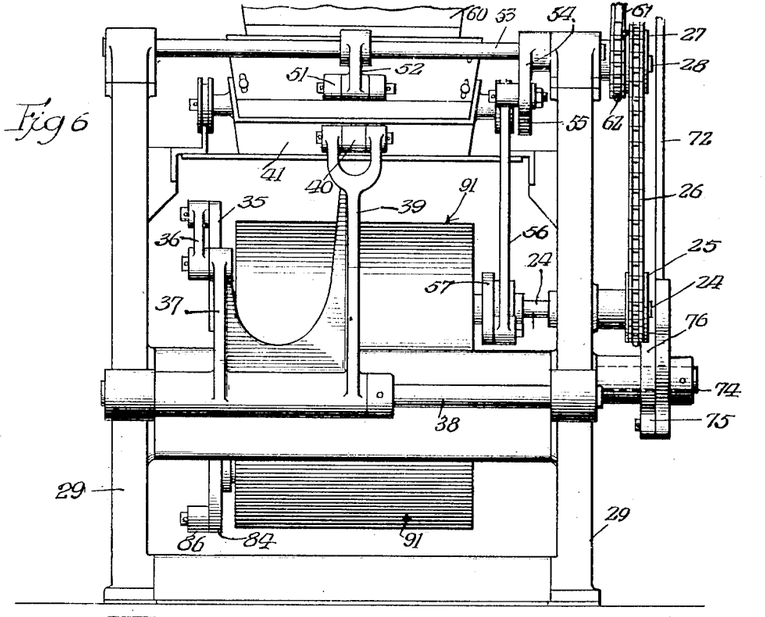
Figure 6 is an end elevation of the lower portion of a machine showing the actuating mechanism unit in position upon the base.
Figure 7:
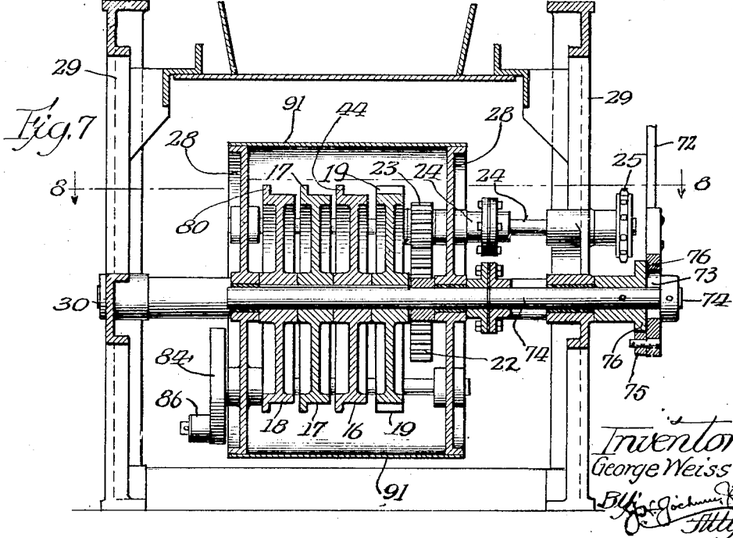
Figure 7 is a detail sectional view taken on line 7—7, Figure 11, with some of the parts omitted.
Figure 8:
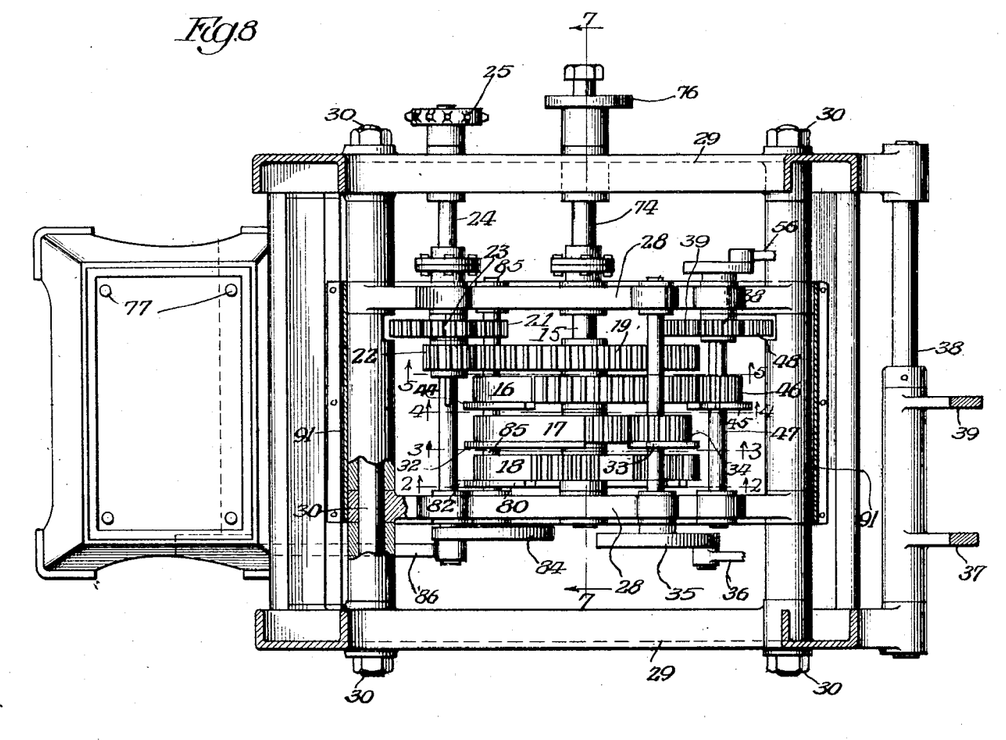
Figure 8 is a horizontal sectional view taken on line 8—8, Figure 7.
Figure 9:
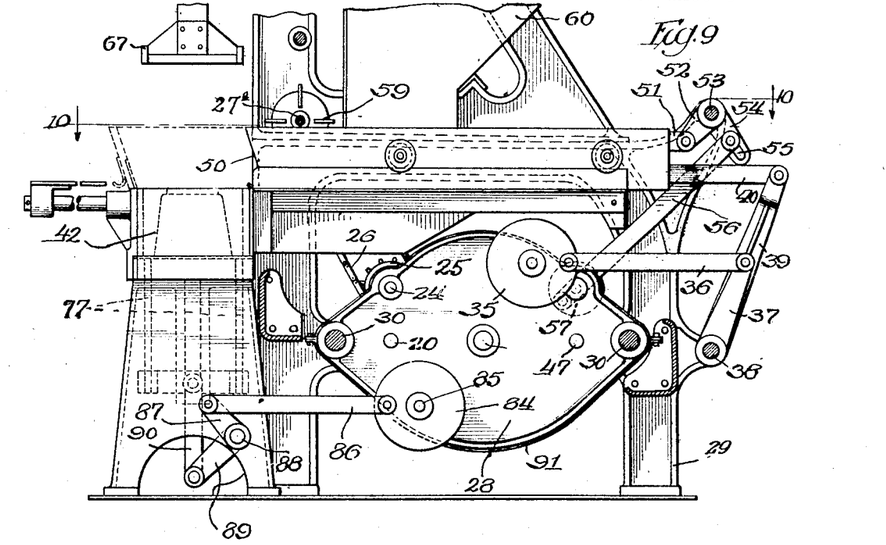
Figure 9 is a side elevation of the lower portion of one form of machine, showing the actuating mechanism unit in position.
Figure 10:
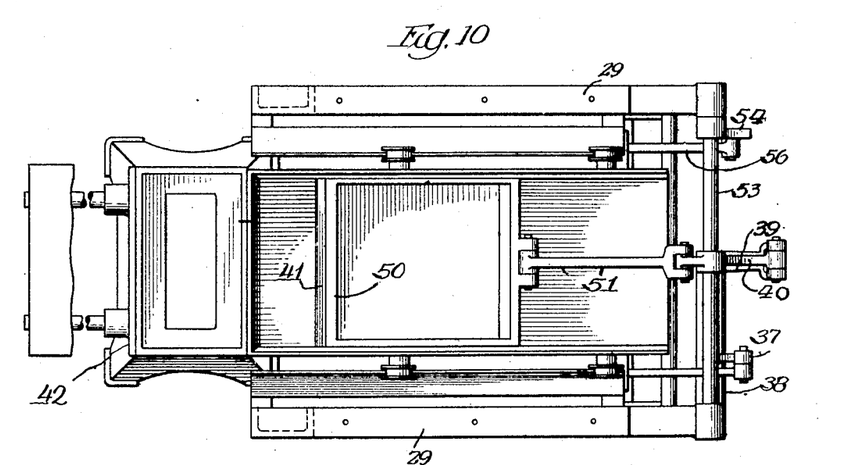
Figure 10 is a view taken on line 10—10, Figure 9, with some of the parts omitted.
Figure 11:
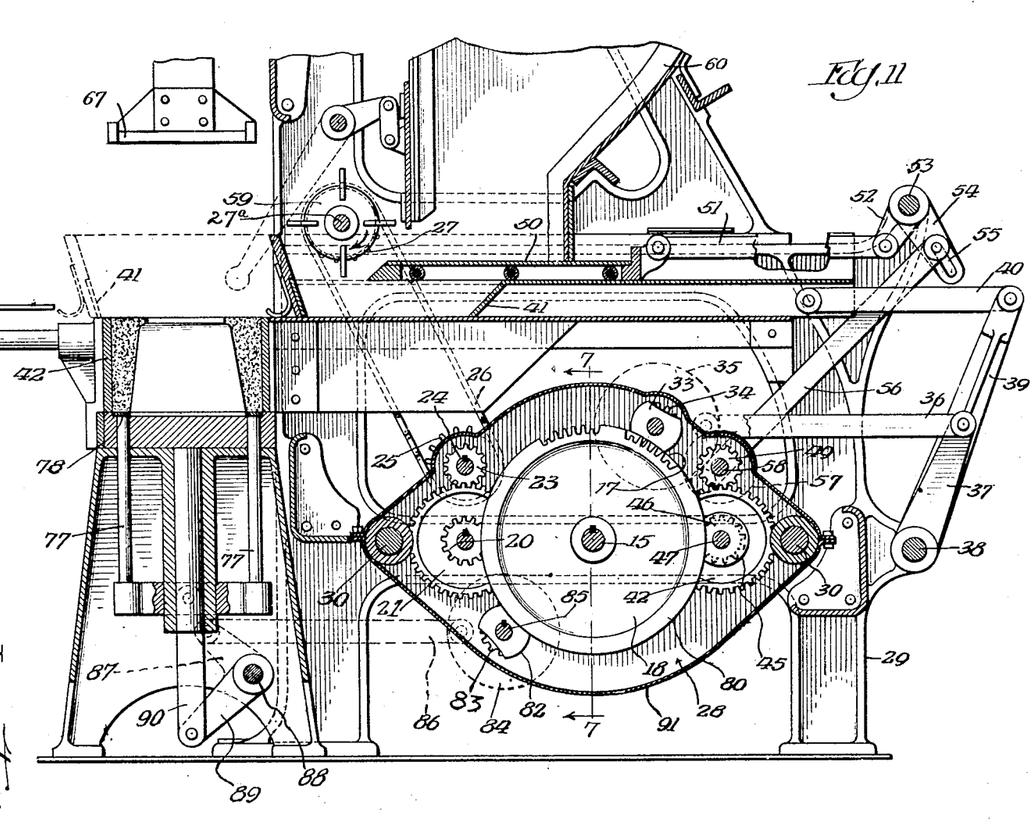
Figure 11 is an enlarged detail view of Figure 9 partly in vertical section.
Figures 12, 13:
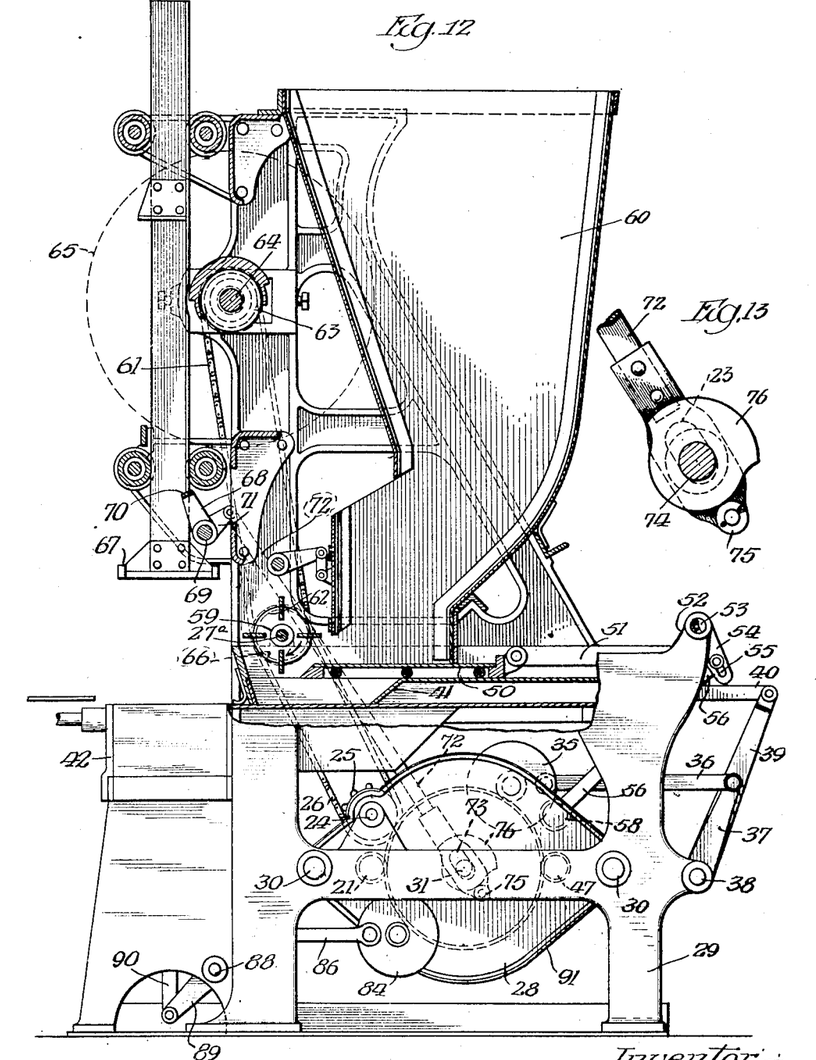
Figure 12 is a view partly in side elevation and partly in vertical section of one complete form of machine to which this improved actuating mechanism is applied.
Figure 13 is an enlarged detail view partly in elevation and partly in section of the crank movement or cam for controlling the locking and unlocking of the tamper.

In carrying this invention into operation there is provided a master gear shaft 15 to which is connected a plurality of master gears 16, 17, and 18, and while three of such master gears are shown in the present exemplification of the invention, it is to be understood that the number of these gears which are to be secured to this shaft will be controlled by the number of steps of operations or functions which it is desired to perform during one complete cycle of rotation of the shaft.

The shaft 15 is rotated by means of a gear 19 connected therewith, and meshing with the gear 19 is a gear 20 carried by a shaft 21, to which latter is also connected a gear 22.

Meshing with the gear 22, is a gear 23 carried by a shaft 24, and connected with the shaft 24 is a sprocket 25 over which a sprocket chain 26 passes.

The sprocket chain also passes over another sprocket wheel 27 carried by a shaft 27ª, and this shaft is rotated in a manner to be hereinafter described.

The shaft 15 is journaled in suitable bearings 27 in spaced members 28, and these members in turn are supported by the frame 29 of the machine by means of rods 30, in a manner to preferably provide a two-point suspension for the members.

Each of the master gears 16, 17 and 18 is designed to be provided with a predetermined number of teeth, so located as to cause co-operating pinions to rotate through a predetermined number of degrees, and then effect a locking of the respective pinions.

The number of revolutions or the extent of each revolution of the respective pinions is determined according to the number of functions or operations which the particular part of the machine that is controlled by the particular pinion, is adapted to perform in timed relation with the remaining pinions of the actuating mechanism, and all in one cycle of operation of the shaft 15.

In the present form of the invention the master gear 17 is provided with two sets of teeth 31 spaced from each other about the periphery of the gear, and where the teeth of the gear 17 are absent, this gear is provided with locking flanges 32 which coincide with and ride upon the respective cutaway portions of a flange 33 on a gear 34.

The teeth of the latter gear mesh with the teeth 31 of the gear 17. The length of the flanges 32 with respect to each other is determined by the functions to be performed and the period of rest it is desired to obtain of the particular mechanism which is controlled or actuated during the rotation of the gear 34. The flanges may be of the same length or they may be of different lengths, to produce the desired periods of dwell or rest of the mechanism controlled thereby and at predetermined times in the cycle of operation of the master gear 17.

The pinion 34 has connected with it a crank 35, which in turn is connected by means of a link 36 with an arm 37 that is connected with a rock shaft 38. Another arm 39 is connected with the rock shaft 38 and is in turn, through the medium of a link 40, connected with a reciprocable feed box 41.

The sets of teeth 31 on the gear 17 are so located with respect to each other that the feed box 41 will be moved forwardly to deliver a charge of material into a mold box 42, and the pinion gear 34 will then be locked against rotation for a predetermined period of time, after which the pinion will be released by reason of the locking flange 32 passing out of contact with the cutaway portion of the flange 33, to permit the other set of teeth 31 to further rotate the pinion 34 and thereby withdraw the feed box 41.

The master gear 16 is provided with teeth 43 extending only partially about its circumference, and where the teeth of the gear are absent this gear is provided with a locking flange 44 which coincides with and rides upon a cutaway portion of a flange 45 on a pinion gear 46. The number of teeth 43 on the gear 16 is preferably such that the pinion gear 46 will be given two revolutions during a portion of the rotation of the gear 16 and will then be locked against rotation during the remaining portion of one cycle of rotation of the gear 16.

The pinion 46 is connected to a shaft 47 which carries a gear 48 that meshes with a gear 49, the latter being of such a diameter with respect to the diameter of the gear 48, that it will be given any desired number of revolutions, here shown as five, during two complete revolutions of the gear 48, to impart five reciprocating movements to a "kicker feed plate" 50 and so that the plate will operate in timed relation with the movements of a tamper to be hereinafter referred to.

The plate 50 is preferably connected by means of a link 51 with a crank arm 52 on a rock shaft 53. This shaft is connected through the medium of an arm 54 and a pin and slot connection 55 with one end of a link 56, the latter being connected by its other end with a crank 57 which in turn is connected with a shaft 58 to which the pinion gear 49 is connected.

The teeth 43 of the gear 16 will therefore, during one cycle of rotation of the gear 16, impart five forward and backward movements to the plate 50, in timed relation with the movements of the tamper. The gear 46 will then be locked by the flanges 44 and 45 thereby effecting a locking of the pinion gear 46 and the kicker plate 50.

A rotary spreader 59 may be mounted adjacent the feed or supply hopper 60, preferably upon the shaft 27ª, and at the bottom of which hopper the plate 50 operates, and the spreader is adapted to feed or throw the material into the hopper 41 when the latter is in position over the mold 42. The spreader is mounted preferably upon the shaft 27ª, the latter being driven preferably by means of an endless belt or chain that passes over a pulley 62 on the shaft 27ª and also over a pulley 63 on a shaft 64. The shaft 64 receives its motion from any suitable source of power (not shown) preferably through the medium of a pulley 65 connected with the shaft 64.

The rotary spreader 59 is provided with suitable blades or plates 66 and is adapted to be given any desired number of complete rotations to operate in timed relation with the plate 50 of the feed box 41.

When the material has been supplied to the mold 42 it is tamped within the mold by means of reciprocable tampers 67, the specific construction of which does not form a part of the subject matter of this application, raised by any suitable means and then released so that they will fall upon the material in the mold.

The tampers are held in their elevated position by means of suitable locking mechanism preferably in the form of a locking dog 68 connected with a shaft 69. The end of the dog 68 is adapted to be seated in a notched or shouldered portion 70 of the upright of the tamper, and is adapted to be withdrawn so as to allow the tamper to fall.

The locking dog is controlled by rocking the shaft 69, preferably through the medium of an arm 71 to which a link 72 is connected.

The link is provided with a slotted portion 73 through when an extension 74 of the shaft 15 passes. Adjacent the end of the link is mounted an anti-friction roller 75 which co-operates with a cam 76 on the extension 74 of the shaft 15.

The cam 76 is so timed that during one complete cycle of rotation of the shaft 15—74, the dog 68 will be moved backwardly and forwardly or in and out with respect to the shouldered portion 70 on the tampers, to lock the tampers in their elevated position and to release the tampers to permit them to descend.

During the period of time intervening between the inward and outward movement of the dog 68, the tampers 67 will be raised and lowered any desired number of times, and they will then be locked in their elevated position during the interval of time that the feed box is being moved forwardly and backwardly, and also will be locked in their elevated position a sufficient length of time to permit the block or article which has been formed in the mold 24, to be removed therefrom.

The block is removed preferably by means of an ejector, which latter, in the present form of the invention, embodies ejecting pins 77 which engage a plate 78 in the bottom of the mold and upon which plate the block is formed.

The ejector is operated in timed relation with the remaining part of the mechanism, by means of the master gear 18, which latter is provided with two sets of teeth 79 spaced from each other, and the teeth extend only partially about the circumference of the gear. Where the teeth of this gear are absent, this gear is provided with locking flanges 80—81 which coincide with and and ride upon cutaway portions of a flange 82 on a pinion gear 83. The number of teeth of each of the series 79 is such that the gear will be given 180 degrees of rotation by one of the sets of teeth, after which the gear will be locked by the flanges 81 and 82 and then the pinion will be given another 180 degrees of rotation by the other set of teeth 79. This will effect the raising and lowering of the ejector which is accomplished through the medium of a crank 84, connected with the shaft 85, on which the pinion gear 83 is mounted.

The crank in turn is connected by means of a link 86 to a crank arm 87 on a rock shaft 88. The shaft is connected by means of a crank arm 89 with a link 90 which in turn is connected with the ejector, so that there will be a positive raising and lowering of the ejector.

The crank mechanism through the medium of which the ejector is operated, is particularly advantageous in the removing of the block or article from the mold, in that there will be imparted a slow or gradual starting movement to the ejector, thereby facilitating in overcoming the resistance against which the ejector operates.

With this improvement it will be manifest that the movement of the various parts of the machine will be positively timed by means of a plurality of master gears which are secured to the same shaft, that the master gears will be simultaneously driven from the same source of power and at the same rate of speed. The master gears and their co-operating pinions are so timed that the pinion gears will be given a predetermined number of degrees of rotation and they will then be locked against further operation, so that other operations in the machine may be effected while certain of the pinions are locked. This will provide a direct gear connection with and a master gear control of the separate and independent movement and there will be a positive locking of such movements all in a complete cycle of operation of the master gear shaft.

Furthermore cam devices and other crank movements may be connected to the same shaft which carries the master gears and these crank movements will also operate in timed relation with the remaining mechanisms, the crank movements serving to impart a gradual or slow starting movement to the mechanisms, thereby facilitating in starting the movements of the parts which are subjected to considerable resistance.

By removing the supporting rods 30 and disconnecting the actuating mechanism from the parts of the machine to which they are connected for operation, the actuating gears, including the master gears and the respective co-operating pinions, may be removed as a complete unit.

Obviously and if desired, a casing 91 may be provided, for covering the master gears and their co-operating pinions, and it is also obvious that any other arrangement of master gears and timing of the various parts or mechanisms of the machines may be provided, according to the nature of the machines and the functions to be performed, as well as the article to be produced. Therefore, it is to be understood that while one specific embodiment of the invention has been herein shown and described, this invention is not to be limited to this particular adaptation thereof as many changes may be made in the details of construction and in the combination and arrangement of the various parts, within the scope of the claims, without departing from the spirit of this invention.

What is claimed as new is:—

1. Actuating mechanism for molding machinery, said mechanism embodying a shaft, a plurality of master gears mounted upon said shaft, means for rotating the shaft, a plurality of separate mechanical movements independent of the shaft, means affording a direct gear connection between each of the said master gears and one of the said movements, and means providing a positive locking of the said movements in timed relation with respect to each other, all in one complete cycle of operation of the said shaft.

2. Actuating mechanism for molding machinery, said mechanism embodying a shaft, a plurality of master gears mounted upon said shaft, pinions individual to and co-operating with each of the master gears, locking flanges on the master gears and their respective co-operating pinions, crank movements individual to and connected with the said pinions, and mechanisms individual to and connected with the respective said crank movements for manipulating the material being handled by the machine.

3. Actuating mechanism for molding machinery, said mechanism embodying a shaft, a plurality of master gears mounted upon said shaft, pinions individual to and co-operating with each of the master gears, locking flanges on the master gears and their respective co-operating pinions, crank movements individual to and connected with the said pinions, and mechanisms individual to and connected with the respective said crank movements for manipulating the material being handled by the machine, all of the said pinions operating in timed relation with respect to each other and each through a predetermined number of degrees of movement during one complete cycle of movement of the said shaft.

4. Actuating mechanism for molding machinery, said mechanism embodying a shaft, a plurality of master gears mounted upon said shaft, pinions individual to and co-operating with each of the master gears, locking flanges on the master gears and their respective co-operating pinions, crank movements individual to and connected with the said pinions, an additional crank movement connected directly with the said shaft, and mechanism individual to and directly controlled by the respective said crank movements for manipulating the material being handled by the machine.

5. Actuating mechanism for molding machinery, said mechanism embodying a shaft, a plurality of master gears mounted upon said shaft, pinions individual to and co-operating with each of the master gears, locking flanges on the master gears and their respective co-operating pinions, crank movements individual to and connected with the said pinions, mechanisms individual to and connected with the respective said crank movements for manipulating the material being handled by the machine, and means constituting a two point suspension for the said gears.

6. Actuating mechanism for molding machinery, said mechanism embodying a shaft, a plurality of master gears mounted upon said shaft, pinions individual to and co-operating with each of the said master gears, locking flanges on the master gears and their respective co-operating pinions, crank movements individual to and connected with the said pinions, mechanisms individual to and connected with the respective said crank movements for manipulating the material being handled by the machine, a tamper, means operating in timed relation with said shaft for actuating the tamper, an additional crank movement connected with the said shaft, and means actuated by the last recited crank movement for locking and unlocking said tamper at predetermined times in the cycle of operation of the said shaft.

7. Actuating mechanism for molding machinery, said mechanism embodying a shaft, a plurality of master gears mounted upon said shaft, means for rotating the shaft, a plurality of separate mechanical movements independent of the said shaft, means affording a direct gear connection between each of the said master gears and one of the said movements, means providing a positive locking of the said movements in timed relation with respect to each other, all in one complete cycle of operation of the said shaft and master gears, a tamper, means also operating in timed relation with said master gears for actuating the tamper, locking means for the tamper, and means affording a direct connection between the said shaft and the last recited locking means for rendering the latter active and inactive at predetermined times in the cycle of operation of the said shaft.

8. Actuating mechanism for molding machinery, said mechanism embodying a shaft, a plurality of master gears mounted upon said shaft, means for rotating the shaft, a plurality of separate mechanical movements independent of the shaft, means affording a direct gear connection between each of the said master gears and one of the said movements, means providing a positive locking of the said movements in timed relation with respect to each other, all in one complete cycle of operation of the said shaft, a structure supporting said gears as a unit like construction, and means affording a two point suspension for the said unit.

In testimony whereof I have signed my name to this specification, on this 12th day of May, A. D. 1926.

GEORGE WEISS.